No. 724,190. PATENTED MAR. 31, 1903.
E. KROUGH & C. & J. E. HOGAN.
CARTRIDGE CARRIER.
APPLICATION FILED APR. 8, 1901.
NO MODEL. 2 SHEETS—SHEET 1.
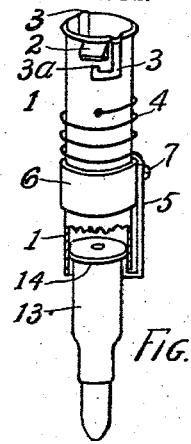
FIG. 1.
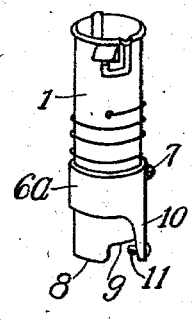
FIG. 2.
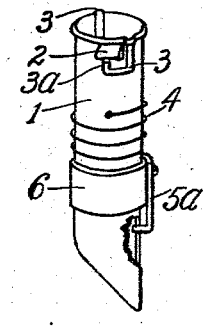
FIG. 3.
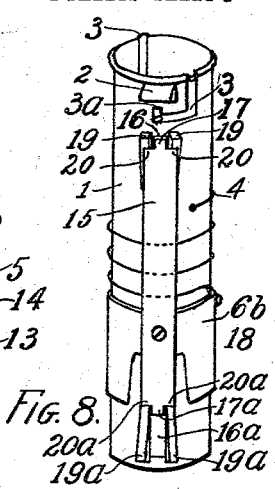
FIG. 7.
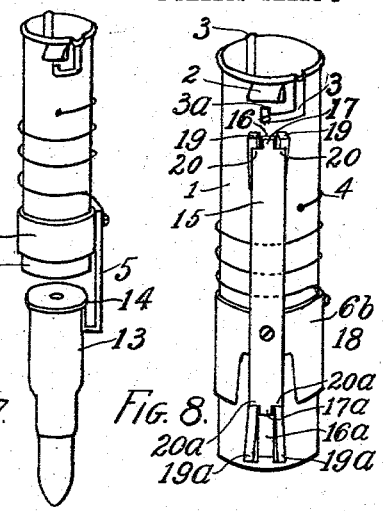
FIG. 8.
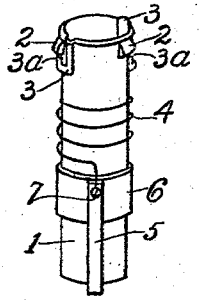
FIG. 4.
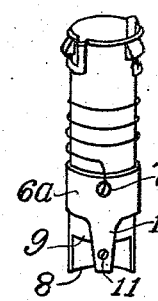
FIG. 5.
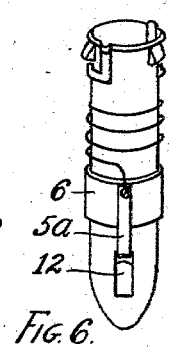
FIG. 6.
FIG. 13. FIG. 14. FIG. 15. FIG. 16.
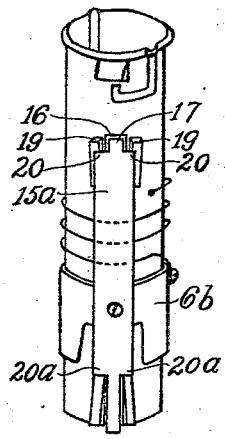
FIG. 9.
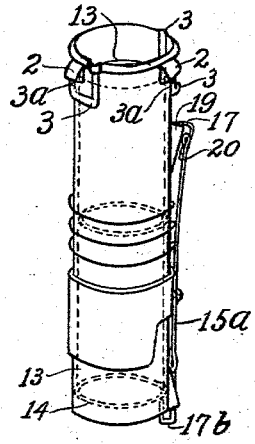
FIG. 10.
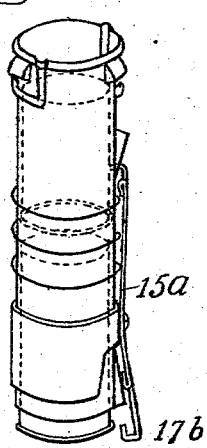
FIG. 11.
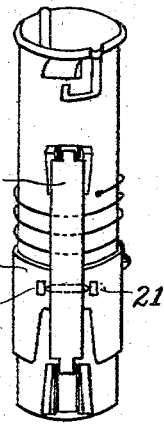
FIG. 12.
WITNESSES:
Ernest A. Eggers
O. W. Eseman
INVENTORS:
Emil Krough, Cornelius Hogan
John E. Hogan.
BY A. N. Gehle
ATTORNEY.

No. 724,190. PATENTED MAR. 31, 1903.
E. KROUGH & C. & J. E. HOGAN.
CARTRIDGE CARRIER.
APPLICATION FILED APR. 8, 1901.
NO MODEL. 2 SHEETS—SHEET 2.
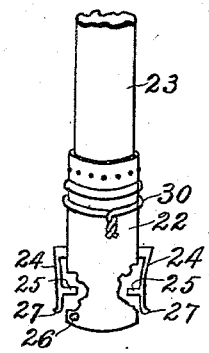
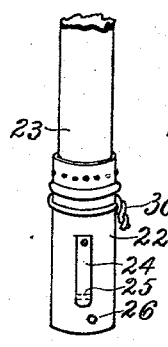
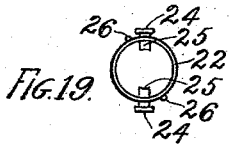
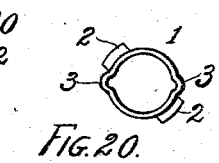
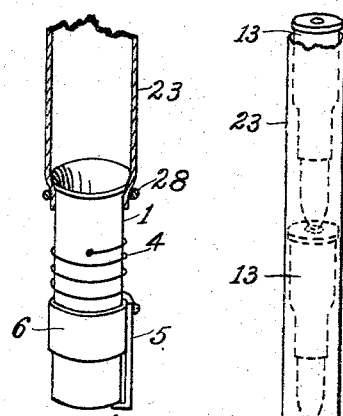
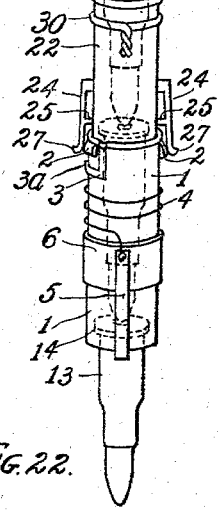
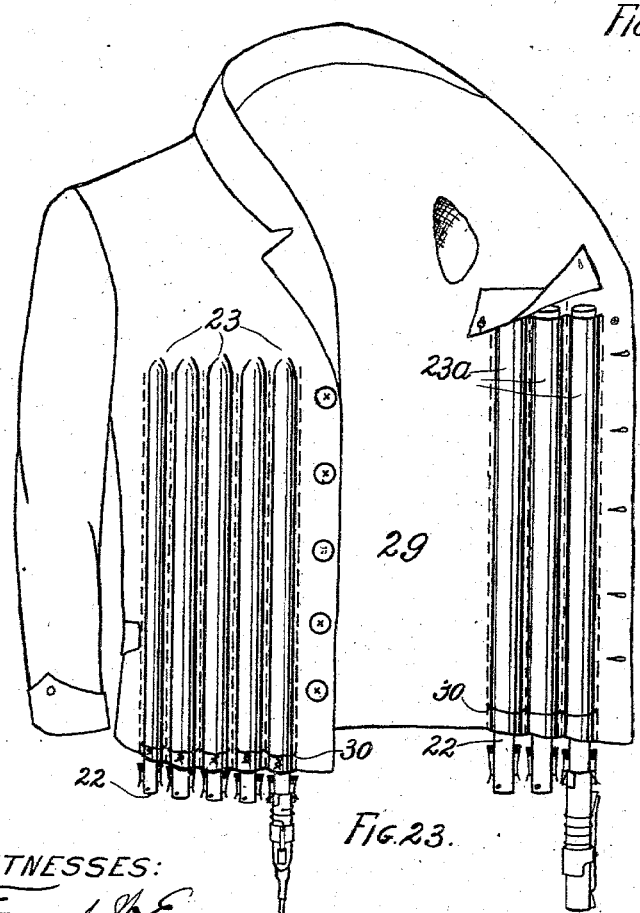
INVENTORS:
Emil Krough
Cornelius Hogan,
John E. Hogan.
BY A. H. Gehle
ATTORNEY.
WITNESSES:
Ernest W. Eggers
O. W. Eseman

UNITED STATES PATENT OFFICE.

EMIL KROUGH, CORNELIUS HOGAN, AND JOHN E. HOGAN, OF CHICAGO, ILLINOIS.

CARTRIDGE-CARRIER.

SPECIFICATION forming part of Letters Patent No. 724,190, dated March 31, 1903.

Application filed April 8, 1901. Serial No. 54,888. (No model.)

*To all whom it may concern:*

Be it known that we, EMIL KROUGH, a subject of the King of Denmark, and CORNELIUS HOGAN and JOHN E. HOGAN, citizens of the United States, all residents of the city of Chicago, in the county of Cook and State of Illinois, have invented certain new and useful Improvements in Cartridge-Carriers, of which the following is a description, reference being had to the accompanying drawings, forming a part of this specification.

Our invention relates to improvements in cartridge carriers or pouches of the class wherein the cartridges are superimposed longitudinally the one upon the other in tubes, a nozzle for the convenient withdrawal of the cartridges being either permanently attached to each tube or an interchangeable one provided which may be used alternately with all the tubes of corresponding size in the carrier; and the objects of our invention are, first, to provide a carrier adapted to contain a large number of cartridges; second, to so dispose the tubes that they may be conveniently carried upon the person of the user, although they may contain a large number of cartridges, and that the discharge ends thereof will be convenient of access to either hand of the user; third, to provide facilities for carrying different kinds and sizes of cartridges in one carrier, each separate from the other and each instantly accessible at any time; fourth, to provide convenient means for withdrawing the cartridges from the tubes one or more at a time and in a position convenient for insertion into the chamber of the gun; fifth, to provide means for quickly changing the nozzle from tube to tube, so that but one nozzle will be required for all the tubes of one size in one pouch or carrier; sixth, to provide means which will effectively prevent the egress of cartridges from the tubes while the nozzle is detached, but which will be automatically removed by attaching the nozzle, or may be removed by hand at any time it is so desired; seventh, to combine all these advantages in a carrier which shall be simple, durable, and inexpensive. We attain these objects by the apparatus and combination of parts illustrated in the accompanying drawings, in which—

Figure 1 is a side view in perspective of a form of discharge-nozzle especially adapted for bullet or rifle cartridges. Figs. 2 and 3 are modifications of Fig. 1. Figs. 4, 5, and 6 are front views, respectively, of Figs. 1, 2, and 3. Fig. 7 shows a nozzle with the cartridge-detaining device in a position for discharging cartridges. Fig. 8 is a front view in perspective of a nozzle especially adapted for shot-cartridges. Fig. 9 is a modification of Fig. 8. Figs. 10 and 11 are side views in perspective of the form shown in Fig. 9, Fig. 11 showing the detaining device in the releasing position. Fig. 12 is another modification of Fig. 8. Fig. 13 is a front and Fig. 14 a side view of the resilient strip used in Fig. 8 for the purpose of engaging the cartridges. Figs. 15 and 16 are similar views of a pivoted lever used for the same purpose in Fig. 12. Figs. 17 and 18 are respectively a front and a side view in perspective of a collar attached to the lower end of a supply-tube and provided with springs and detaining-catches adapted to prevent the escape of cartridges from the tube while the nozzle is detached and also the means for attaching the nozzle to the said collar. Fig. 19 is a plan view of the lower end of the said collar. Fig. 20 is a plan view of the top of the nozzles shown in Figs. 1 to 12. Fig. 21 shows a method of permanently attaching either the nozzle or the collar to the tube. Fig. 22 shows a supply-tube with the collar and discharge-nozzle attached thereto, and Fig. 23 shows two sizes of the tubes sewed in between two thicknesses of the cloth in the front part of a coat with an interchangeable nozzle attached to one tube of each size.

Similar numerals refer to similar parts throughout the several figures.

Referring to the drawings, the tube 1, preferably of metal, is provided at its upper end and preferably on opposite sides thereof with the wedge-shaped pieces 2 2 and the grooves 3 3, the said grooves extending downwardly from the upper edge of the tube 1 to a short distance below the wedges 2 2 and then turning, substantially as shown in the drawings. These grooves are preferably made by being pressed into the walls of the tube 1, thus leaving the metal unbroken; but they may also be made by cutting away the metal or in any suitable manner. A coiled spring 4 surrounds the tube 1 and is attached to said tube at one of its ends, the opposite end of said spring being attached to the cartridge-detaining device 5, which in turn is attached to the collar 6. This collar is of such a diameter as to fit closely around tube 1, but at the same time allowing it to move freely thereon. It should be sufficiently wide to afford a good base for attaching the detainer 5 and to guard against wedging or sticking on the tube when being operated. The detainer 5 in this instance consists of a double hook, the stem of which is attached to the collar 6 by a screw, rivet, or other suitable means 7, while the opposite end (the hook proper) extends across the edge of and back into the tube 1, the part within the tube being practically parallel with the wall of said tube.

In Fig. 2 the lower end of tube 1 is longer on one side 8 than on the other side 9, and the collar $6^a$ is provided with a projection 10, extending past the short side 9 of the tube. A pin, screw, or the like 11 is fastened to projection 10, near the lower end thereof, and extending substantially at a right angle thereto and partly across the opening of the tube 1, thus normally preventing the egress of cartridges therefrom.

In Fig. 3 the lower end of the nozzle is chamfered and a slot 12, Fig. 6, cut longitudinally into the longer part and extending past the edge of the shorter part. Through this slot and transversely into the tube extends the point of detainer $5^a$, the opposite end of which is attached to collar 6, the same as in Fig. 1.

The diameter of tube 1 is enough larger than that of the cartridges for which it is to be used that they will readily pass through it, and the detainers 5, 11, and $5^a$ extend transversely into the tube, so as to engage the rim of the cartridges while allowing the body thereof to pass by, as shown in Figs. 1 and 7.

The operation is as follows: The cartridges 13 feed by gravity from the supply-tubes 23, $23^a$, Figs. 22 and 23, into the discharge-tube 1 and pass through it until stopped by the engagement of the rim 14 of the first cartridge with the detainer 5, $5^a$, or 11, the tension of the spring 4 holding the detainer in the proper position. If now it is desired to withdraw a cartridge, it may be done instantly by simply grasping the end of the cartridge protruding from the nozzle and pulling it downward until the rim of the cartridge has passed the lower edge of tube 1, as shown in Fig. 7, when the rim 14 will slip off the catch 5 and the cartridge be entirely released. As soon as the cartridge is thus released the spring 4 will retract the detainer to its normal position and prevent the succeeding cartridges from passing out of the nozzle. If, however, it is desired to withdraw a number of cartridges without interruption, it may be done by holding the detainer in the position shown in Fig. 7. This may be conveniently done by grasping the collar 6 between the thumb and forefinger. If shot-cartridges be used instead of bullet or rifle cartridges, they are placed in the supply-tubes with the rim or primer end down, and as the detainer engages the rim no part of the cartridge will protrude from the nozzle. They may, however, be readily withdrawn by grasping the collar 6 and pulling it down to the discharging position, Fig. 7, the cartridges following by gravity.

In Fig. 8 the resilient strip 15 is provided at each end with a catch adapted to project transversely into tube 1 through slots 16 and $16^a$, the upper catch 17 being normally drawn out of the tube, so as to permit the passage of cartridges, while the lower one, $17^a$, normally obstructs the lower opening of the nozzle. The strip 15 is attached to the collar $6^b$ by a screw, rivet, or other suitable means 18. The wedge-shaped pieces 19 19 and $19^a$ $19^a$ are mounted on opposite sides of and substantially parallel with slots 16 and $16^a$. The said wedge-shaped pieces 19 19 slope toward the discharge end of the tube 1, and the wedge-shaped pieces $19^a$ $19^a$ slope toward the upper end of the said tube. A controlling-spring 4 is attached to the collar $6^b$ and to the tube 1, as in previously-described figures. The ends of the strip 15 are preferably made wide enough to span the inclined surfaces 19 19 and $19^a$ $19^a$, as shown at 20 20 and $20^a$ $20^a$, and its length is enough greater than that of the cartridge so that when the catch $17^a$ engages the lower cartridge the upper catch 17 will be opposite the next succeeding one, as shown in Fig. 10. The strip 15 may, however, be made longer, so as to span two or more cartridges instead of only one. The tension of spring 4 normally holds the collar $6^b$ and cartridge-detaining devices mounted thereon in the position shown, with the catch $17^a$ within and the catch 17 out of the tube. When, however, the collar $6^b$ is drawn downward, the shoulders $20^a$ $20^a$ of the strip 15 ride up on the inclined surfaces $19^a$ $19^a$ and draw the catch $17^a$ transversely out of the tube 1 through the slot $16^a$, thus releasing the cartridge lowermost in the tube. Simultaneously with this action the shoulders 20 20 slide down on 19 19, bringing catch 17 into engagement with the cartridge opposite it, the further advance of which is thereby arrested until the collar $6^b$ is again released, allowing all parts to return to their normal positions. When this takes place, the movements just described are reversed, spring 4 drawing collar $6^b$, and with it the resilient strip 15, upward, the shoulders $20^a$ $20^a$ sliding down the incline on $19^a$ $19^a$ and drawing catch $17^a$ through slot $16^a$ into the tube 1, while the shoulders 20 20 ride up the incline on 19 19 and withdraw catch 17 from engagement with the cartridge. Thus released, the cartridges advance by gravity until engaged by catch $17^a$. From the above description it will be seen that the cartridges may be withdrawn from this form of nozzle in the same manner as previously described in connection with Figs. 1 to 7, except that the advance of the cartridges is automatically interrupted simultaneously with the release of the one lowermost in the nozzle, and hence the detaining devices must be allowed to return to their normal positions before a second cartridge can be discharged. It may, however, be adapted to discharge several cartridges without interruption by simply removing the upper catch 17 or by making the strip 15 long enough to span two or more cartridges, all below the upper catch 17 being released when the collar $6^b$ is drawn downward. Again, if the cartridges are placed into the supply-tubes with the rim or primer end up, as shown in Fig. 1, the body of the cartridges will pass by the catch $17^a$ and protrude from the nozzle. Then, as the length of the strip 15 is always greater than that of a cartridge, it will entirely span the second cartridge and bring the upper catch 17 opposite the third or a succeeding cartridge.

In Figs. 9, 10, and 11 the lower slot $16^a$ is omitted, the resilient strip $15^a$ extending beyond the lower end of tube 1 and being then formed into a double hook $17^b$, Figs. 10 and 11, similar to that shown at 5 in Figs. 1 and 7. When the collar $6^b$ is drawn downward, the strip $15^a$ follows, drawing the hook $17^b$ longitudinally out of the lower end of the tube 1, and as the shoulders $20^a$ $20^a$ ride up the incline on $19^a$ $19^a$ the hook $17^b$ will also be drawn transversely toward and finally past the edge of the tube, thus releasing the cartridge, as shown in Fig. 11.

The nozzle shown in Fig. 12 is identical in construction and operation with the one shown in Fig. 8, except that a lever $15^b$ is used and is mounted upon collar $6^b$ by a pivotal bearing 21 21 instead of the resilient strip 15 and its attachment 18 in Fig. 8.

Fig. 13 is a front view of the resilient strip 15 before its ends are bent to form the catches 17 $17^a$. The parts shown by dotted lines are preferably bent under the main body, as shown at 20 $20^a$, Fig. 14, to form the shoulders 19 $19^a$, or they may be cut away entirely.

Figs. 15 and 16 show the preferred construction of lever $15^b$.

While we prefer to make the resilient strip 15 and the lever $15^b$ integral with the catches 17 $17^a$ and also with the shoulders 20 $20^a$, we do not wish to limit ourselves to this construction, as it is evident that other forms of construction may be adopted that will accomplish the same results without departing from the spirit of our invention.

The device illustrated in Figs. 17, 18, and 19 enables us to quickly change the discharge-nozzle, Figs. 1 to 12, from one supply-tube to another, and therefore but one nozzle need be furnished for any number of supply-tubes of the same size combined in a carrier. This materially cheapens the cost of the carrier and also reduces its weight.

Referring to Figs. 17, 18, and 19, a collar 22, preferably of metal, is attached by any preferable means to the supply-tube 23. Springs 24 24, provided with cartridge-detaining catches 25 25, are mounted upon the collar 22 in any suitable manner and preferably on opposite sides thereof, the tension of the springs 24 24 tending to force the catches 25 25 through suitable slots (not shown) into the interior of collar 22, thus effectively preventing the escape of cartridges from the supply-tube 23. The pins 26 26 are so located with reference to the springs 24 24 that in attaching the discharge-nozzle 1 by slipping it up over the collar 22 the pins will fit into the grooves 3 3 at the upper end of the nozzle, while the wedges 2 2 will enter between the collar 22 and the ends 27 27 of the springs 24 24, the said ends 27 27 riding up on the wedges 2 2, thereby drawing the cartridge-detaining catches 25 25 transversely out of the collar 22 and allowing the cartridges to pass from the supply-tube 23 into the discharge-nozzle 1. If the said nozzle be then first turned to the right and then drawn downward, so that the pins 26 26 enter the short vertical parts $3^a$ $3^a$ of grooves 3 3, it (the said nozzle) will be held in that position by the weight of the cartridges and an accidental disconnection prevented. When all cartridges have been discharged from a supply-tube, the nozzle may readily be detached, as will be seen, and attached to another tube, and so on until all the supply-tubes have been emptied of cartridges.

We do not wish to be understood as limiting ourselves to the particular form and arrangement of parts shown in Figs. 17, 18, and 19, as it is self-evident that there are many ways of accomplishing the same result without departing from the scope of our invention.

When it is desired to attach a discharge-nozzle permanently to each supply-tube, the collar 22, together with its fittings and the wedges 2 2 and grooves 3 3 on the upper part of the nozzle 1, may be omitted and the attachment made as shown in Fig. 21 or in any other suitable manner. In Fig. 21 the upper end of the nozzle is flared out and the lower end of the supply-tube 23 slipped over it, being then tied fast by a wire, band, or the like 28.

It is sometimes desirable that either bullet or shot cartridges be instantly accessible for use, and to meet this requirement we have invented the carrier illustrated in Fig. 23. Here the supply-tubes $23^a$ are adapted especially for cartridges loaded with shot and are therefore of a larger diameter than are the ones (23) intended for bullet-cartridges, the respective diameters depending, of course, entirely upon that of the cartridges to be carried in each. We prefer to place these tubes between two thicknesses of the cloth composing the front of the coat or vest 29 and to fasten them there by stitching along the sides of the individual tubes in such a manner that the cloth will be drawn tightly around each tube, thus holding them firmly, while at the same time any tube may be withdrawn and reinserted at will. To prevent their slipping downward, we preferably provide a tie 30, passing around the collar 22 and through the cloth of the garment 29. We do not, however, wish to limit ourselves to this manner of attachment nor to the combination of the supply-tubes with a garment, as it is evident that other means of supporting the tubes and of their attachment to said support may be used; nor is it necessary that the carrier consist of more than one tube or that the tubes be of more than one size, so long as one or more nozzles embodying the principle or mechanism substantially as herein described and claimed be used in connection therewith.

The phrase "a plurality of cartridge-receptacles" as herein used denotes tubes of one or more sizes.

Having thus described our invention, what we claim as new, and desire to secure by Letters Patent, is—

1. The combination with a cartridge-receptacle adapted to receive a plurality of cartridges end to end, of means for normally engaging the end cartridge, means adapted to engage a succeeding cartridge, and means for actuating said engaging means simultaneously in different directions to cause the release of the cartridge or cartridges between the said engaging means, and the detention of all the remaining cartridges, substantially as described.

2. The combination with a plurality of cartridge-receptacles, of an interchangeable nozzle therefor, a detaining device carried upon said nozzle, and means for actuating the detaining device to release the end cartridge, substantially as described.

3. The combination with a cartridge-receptacle of a detachable nozzle therefor, a pair of detaining devices one for engaging the end cartridge and the other for engaging the cartridge adjacent thereto, and means for actuating said detaining devices in relatively opposite directions, substantially as described.

4. The combination with a cartridge-receptacle having a nozzle, of a sleeve or part adapted to slide upon said nozzle and a detaining device actuated by said sliding part and adapted normally to engage the end cartridge and to release the same with one movement of said sliding part, substantially as described.

5. The combination with a cartridge-receptacle and a nozzle therefor, of a collar or part sliding upon said nozzle, a detaining device associated with said sliding part and adapted in one position thereof to engage the end cartridge and in the other position to entirely disengage the end cartridge, and a spring for normally maintaining said sliding part in position to cause said detaining device to engage said cartridge, substantially as described.

6. The combination with a cartridge-receptacle and a nozzle therefor, of a collar or sliding part mounted upon said nozzle, a pivoted lever carried thereon and having means at the opposite ends thereof, one to engage the end cartridge and the other to engage a succeeding cartridge, and means whereby the sliding of said part longitudinally causes one of said engaging means to release the end cartridge and the other engaging means to engage a succeeding cartridge, substantially as described.

7. The combination with a coat or other garment, of a plurality of cartridge-receptacles mounted thereon, an interchangeable nozzle adapted to be alternately attached to any one of a number of said receptacles and provided with means adapted to slide upon said nozzle to engage and release the cartridges, substantially as described.

8. The combination with a coat or other garment, of a plurality of cartridge-receptacles mounted thereon, an interchangeable nozzle adapted to be alternately connected with any one of the plurality of receptacles, a detaining device carried upon said nozzle and adapted to engage the end cartridge, and means adapted to slide upon said nozzle for actuating said detaining device to cause the same to release the end cartridge, substantially as described.

9. The combination with a coat or garment, of a plurality of cartridge-receptacles carried thereon, an interchangeable nozzle adapted to be alternately connected with any one of said receptacles, a pair of detaining devices carried upon said nozzle, and adapted to slide thereon, one adapted to engage and release the end cartridge, and the other adapted to engage the cartridge adjacent thereto, substantially as described.

10. The combination with a plurality of cartridge-receptacles of two or more sizes combined in a carrier and adapted to receive correspondingly different sizes of cartridges, of an interchangeable nozzle for each of said sizes, the said nozzles being adapted to be alternately attached to any one receptacle corresponding thereto in size, and cartridge-detaining devices mounted upon said nozzles and adapted to engage and release the cartridges, substantially as described.

11. The combination with a cartridge-receptacle, of one or more cartridge-detaining catches, and means adapted to be engaged by an interchangeable nozzle to actuate the said catches when attaching or detaching said nozzle, substantially as described.

12. The combination with a plurality of cartridge-receptacles, of one or more cartridge-detaining catches for each of said receptacles, means for actuating said catches, and an interchangeable nozzle adapted to be attached to any one of said receptacles and provided with means for engaging said actuating means, substantially as described.

13. The combination with a plurality of cartridge-receptacles, of one or more cartridge-detaining catches for each of said receptacles, means for actuating said catches, means for carrying said receptacles, and one or more interchangeable nozzles adapted to be attached to said receptacles, said nozzles being provided with means for engaging said actuating means to release the cartridges, and with means for reëngaging the cartridges and for releasing the same one or more at a time as desired, substantially as described.

14. The combination with a plurality of cartridge-receptacles of two or more sizes adapted to receive correspondingly different sizes of cartridges, of one or more cartridge-detaining catches for each of said receptacles, means for actuating said catches, means for carrying said receptacles, and one or more interchangeable nozzles for each size of said receptacles, said nozzles being adapted to be alternately attached to any one receptacle corresponding thereto in size, said nozzles being also provided with means for engaging said actuating means to release the cartridges, and with means for reëngaging and again releasing the cartridges as desired, substantially as described.

In testimony whereof we have hereunto signed our names in the presence of subscribing witnesses.

EMIL KROUGH.
CORNELIUS HOGAN.
JOHN E. HOGAN.

Witnesses for Emil Krough and Cornelius Hogan:
HENRY DAVIES,
WILLIAM GRIMES.

Witnesses for John E. Hogan:
ABE GOLDSMITH,
WILLIAM GRIMES.